(12) United States Patent
Chen

(10) Patent No.: US 11,005,376 B2
(45) Date of Patent: May 11, 2021

(54) SWITCHING POWER SUPPLY CONTROLLER

(71) Applicant: FUJI ELECTRIC CO., LTD., Kawasaki (JP)

(72) Inventor: Jian Chen, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 16/729,934

(22) Filed: Dec. 30, 2019

(65) Prior Publication Data

US 2020/0266704 A1 Aug. 20, 2020

(30) Foreign Application Priority Data

Feb. 14, 2019 (JP) .............................. JP2019-024067

(51) Int. Cl.
*H02M 3/335* (2006.01)
*H02M 3/156* (2006.01)
*H02M 1/36* (2007.01)
*H02M 1/08* (2006.01)
*H02M 1/00* (2006.01)

(52) U.S. Cl.
CPC ......... *H02M 3/33507* (2013.01); *H02M 1/08* (2013.01); *H02M 1/36* (2013.01); *H02M 3/156* (2013.01); *H02M 2001/0035* (2013.01)

(58) Field of Classification Search
CPC ..................... H02M 1/08; H02M 1/36; H02M 3/155–1588; H02M 2001/0032; H02M 2001/0035
See application file for complete search history.

(56) References Cited

U.S. PATENT DOCUMENTS

| | | | | |
|---|---|---|---|---|
| 6,154,375 A | * | 11/2000 | Majid | ...................... H02M 1/36 363/16 |
| 7,313,004 B1 | * | 12/2007 | Yang | ................. H02M 3/33523 363/21.02 |
| 8,553,471 B2 | * | 10/2013 | Kim | ...................... G11C 29/028 365/189.05 |
| 9,979,308 B1 | | 5/2018 | Herrera et al. | |
| 10,158,282 B1 | * | 12/2018 | Maruyama | .......... H02M 1/4225 |
| 10,892,688 B2 | * | 1/2021 | Chen | ................. H02M 3/33515 |
| 2006/0006811 A1 | * | 1/2006 | Green | ................ H05B 41/3927 315/209 R |

(Continued)

*Primary Examiner* — Yusef A Ahmed

(74) *Attorney, Agent, or Firm* — Rabin & Berdo, P.C.

(57) ABSTRACT

A switching power supply controller, including a high-side drive circuit, a low-side drive circuit, a control circuit which supplies a high-side drive signal to the high-side drive circuit, and which supplies a low-side drive signal to the low-side drive circuit, an oscillation circuit which generates an on-trigger signal and an off-trigger signal at a switching frequency corresponding to a voltage signal, and which supplies the on-trigger signal and the off-trigger signal to the control circuit, and a precharge circuit which receives from the control circuit a burst operation signal, indicative of a burst operation in a standby mode, and which supplies for a second period a precharge signal that causes the control circuit to output the low-side drive signal upon detecting that a switching stop period, during which the first voltage signal falls below a threshold voltage, exceeds a first period.

2 Claims, 10 Drawing Sheets

(56) References Cited

U.S. PATENT DOCUMENTS

| | | | |
|---|---|---|---|
| 2012/0113689 A1* | 5/2012 | Chen | H02M 3/33523 363/21.17 |
| 2012/0230064 A1* | 9/2012 | Yang | H02M 3/33523 363/21.15 |
| 2014/0063865 A1* | 3/2014 | Nate | H02M 3/33515 363/21.13 |
| 2015/0263629 A1* | 9/2015 | Stuler | H02M 3/3376 363/21.02 |
| 2016/0065075 A1* | 3/2016 | Sugahara | H02M 3/3376 363/21.02 |
| 2016/0164425 A1* | 6/2016 | Chen | H02M 3/33553 363/21.07 |
| 2017/0110971 A1* | 4/2017 | Degen | H02M 3/337 |
| 2017/0155333 A1* | 6/2017 | Chen | H02M 3/3376 |
| 2017/0201183 A1* | 7/2017 | Chen | H02M 1/44 |
| 2017/0222565 A1* | 8/2017 | Sonobe | H02M 1/14 |
| 2017/0237356 A1* | 8/2017 | Chen | H02M 3/33553 363/21.02 |
| 2017/0331384 A1* | 11/2017 | Chen | H02M 3/33553 |
| 2017/0373604 A1* | 12/2017 | Chen | H02M 1/36 |
| 2018/0041126 A1* | 2/2018 | Zhang | H03K 5/1536 |
| 2018/0041131 A1* | 2/2018 | Sugahara | H02M 3/3376 |
| 2018/0062383 A1* | 3/2018 | Kawashima | H02M 3/33523 |
| 2018/0198364 A1* | 7/2018 | Chen | H02M 3/3376 |
| 2019/0341854 A1* | 11/2019 | Kohara | H02M 3/33569 |
| 2020/0195151 A1* | 6/2020 | Chen | H02M 3/33592 |
| 2020/0358360 A1* | 11/2020 | Sonobe | H02M 1/36 |

* cited by examiner

| STATE NAME | DESCRIPTION | INTERNAL BEHAVIOR |
|---|---|---|
| St0 | IDLE STATE | Cbs_chg = L |
| St1 | COUNT Toff_burst | Cbs_chg = L |
| St2 | COUNT Tcbs_chg<br>Tcbs_chg: PERIOD FOR WHICH PRECHARGE SIGNAL Cbs_chg IS AT H-LEVEL | Cbs_chg = H |

FIG. 8

SWITCHING POWER SUPPLY CONTROLLER

CROSS-REFERENCE TO RELATED APPLICATION

This application is based upon and claims the benefit of priority of the prior Japanese Patent Application No. 2019-024067, filed on Feb. 14, 2019, the entire contents of which are incorporated herein by reference.

BACKGROUND OF THE INVENTION

1. Field of the Invention

The embodiment discussed herein relates to a controller which controls a current resonance switching power supply and which maintains a voltage of a high-side power source at the time of switching being stopped in a burst operation for a certain period.

2. Background of the Related Art

Current resonance switching power supplies are suitable for increasing efficiency or reducing thickness and are therefore widely adopted in liquid crystal televisions, alternating current (AC)/direct current (DC) adapters, and the like. With current resonance switching power supplies, a half-bridge circuit including a high-side switching element and a low-side switching element that are cascade-connected is used for converting a direct-current voltage to a determined alternating-current voltage and the alternating-current voltage to a determined direct-current voltage. The high-side switching element is driven by a high-side drive circuit, and the low-side switching element is driven by a low-side drive circuit. The high-side drive circuit and the low-side drive circuit are housed in a controller which is an integrated circuit (IC). Power is supplied from a high-side power source to the high-side drive circuit, and power is supplied from a low-side power source to the low-side drive circuit. The high-side power source and the low-side power source are independent of each other. Usually, a bootstrap power source floated from a ground potential of the low-side drive circuit is used as the high-side power source of the controller in which the high-side drive circuit and the low-side drive circuit are housed in this way.

When the high-side switching element or the low-side switching element performs a switching operation, a high-side reference potential swings between a voltage of the low-side power source and the ground potential of the low-side drive circuit. The bootstrap power source utilizes this. That is to say, with the bootstrap power source, the low-side power source charges a bootstrap capacitor via a bootstrap diode when the low-side switching element is in an on state. Furthermore, when the low-side switching element is in an off state, a positive electrode terminal of the bootstrap capacitor is insulated with the bootstrap diode and a negative electrode terminal of the bootstrap capacitor is insulated with the low-side switching element. Accordingly, the bootstrap power source becomes an independent high-side power source.

By the way, in order to accommodate recent global warming countermeasures, a current resonance switching power supply which reduces as much as possible electric power consumption at the time of part of the functions of an electric device, which is a load, not being used is developed. Such a switching power supply has not only a normal operation mode at a normal operation time but also a standby mode in which power consumption is reduced at the time of a load being light.

In the standby mode, a burst operation is performed. That is to say, after switching of a switching element is performed for a certain period, switching of the switching element is stopped for a certain period. This operation is repeated. With the burst operation, a switching stop period is set. This considerably reduces the average standby power at a standby mode time of a switching power supply. In addition, with the burst operation, as a load becomes lighter, the switching stop period becomes longer. If there is no load, then the switching stop period becomes still longer and the standby power is reduced further.

If the load state of such a switching power supply changes from a light-load state to a no-load state at a burst operation time, then the switching stop period may become very long. While switching is stopped, the operation of a high-side drive circuit is continued and consumption of the energy of a high-side power source is continued. During that time, however, a bootstrap capacitor is not charged. As a result, the voltage of the high-side power source may fall during the switching stop period below a voltage needed to maintain the operation of the high-side drive circuit. In this case, if the load state of the switching power supply returns from the no-load state to a light-load state or a normal-load state, then the high-side drive circuit may fail to operate normally. As a result, an off-resonance phenomenon may occur and this may cause destruction of a switching element.

On the other hand, a technique for preventing at a burst operation time a voltage of a bootstrap capacitor, which is a high-side power source, from falling below a voltage needed to maintain the operation of a high-side drive circuit is known (see, for example, U.S. Pat. No. 9,979,308). According to the technique described in U.S. Pat. No. 9,979,308, for example, energy stored in an output capacitor on the secondary side of a transformer is supplied to the bootstrap capacitor on the primary side of the transformer to suppress a fall in the voltage of the bootstrap capacitor. In order to realize this, a synchronous rectifier switch is used as a rectifier on the secondary side of the transformer and switching of the synchronous rectifier switch is performed during a switching stop period in a burst operation. By doing so, energy stored in the output capacitor is transmitted to the primary side and the bootstrap capacitor is charged. As a result, a voltage needed as the high-side power source is always ensured during the switching stop period in a burst operation and an off-resonance phenomenon does not occur.

With the technique described in, for example, U.S. Pat. No. 9,979,308, however, though burst operation is performed in order to reduce standby power, the synchronous rectifier switch is always operated in the standby mode. Thus, there remains a problem because this increases standby power.

SUMMARY OF THE INVENTION

According to an aspect, there is provided a switching power supply controller including a high-side drive circuit; a low-side drive circuit; a control circuit which supplies a high-side drive signal to the high-side drive circuit, and which supplies a low-side drive signal to the low-side drive circuit; an oscillation circuit which generates an on-trigger signal and an off-trigger signal at a switching frequency corresponding to a voltage signal, and which supplies the on-trigger signal and the off-trigger signal to the control circuit; and a precharge circuit which receives from the control circuit a burst operation signal, indicative of a burst operation in a standby mode, and which supplies for a second period a precharge signal that causes the control circuit to output the low-side drive signal upon detecting that a switching stop period, during which the first voltage signal falls below a threshold voltage, exceeds a first period.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 8 is a view for describing the state of the state machine;

DETAILED DESCRIPTION OF THE INVENTION

An embodiment will now be described in detail with reference to the accompanying drawings. Components in figures indicated by the same numerals are the same. Furthermore, in the following description, the same numeral may be used for representing the name of a terminal and a voltage, a signal, or the like at the terminal.

Figure 1:
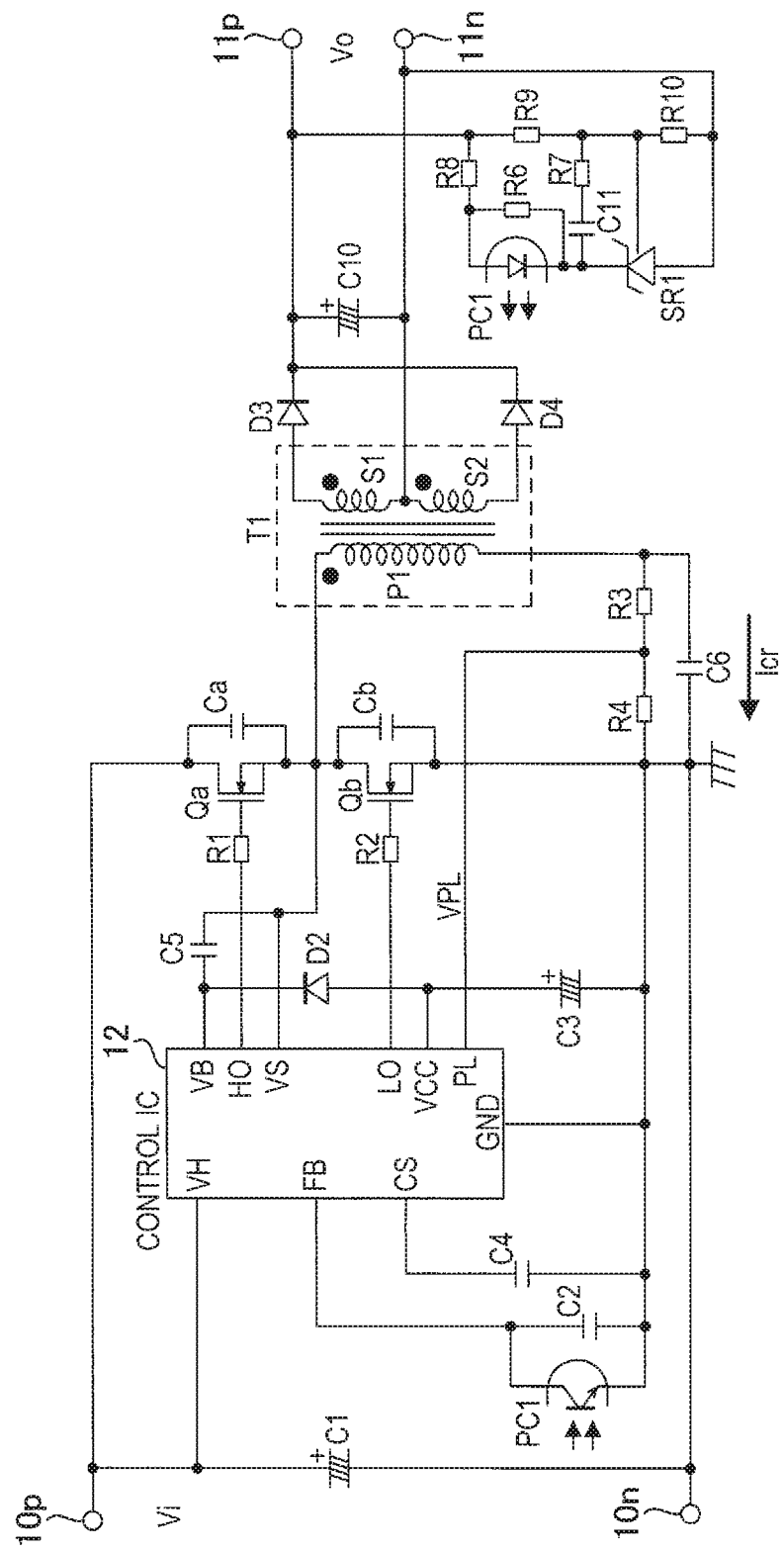
FIG. 1 is a circuit diagram illustrative of an example of the structure of a current resonance switching power supply including a control IC according to an embodiment.
Figure 2:
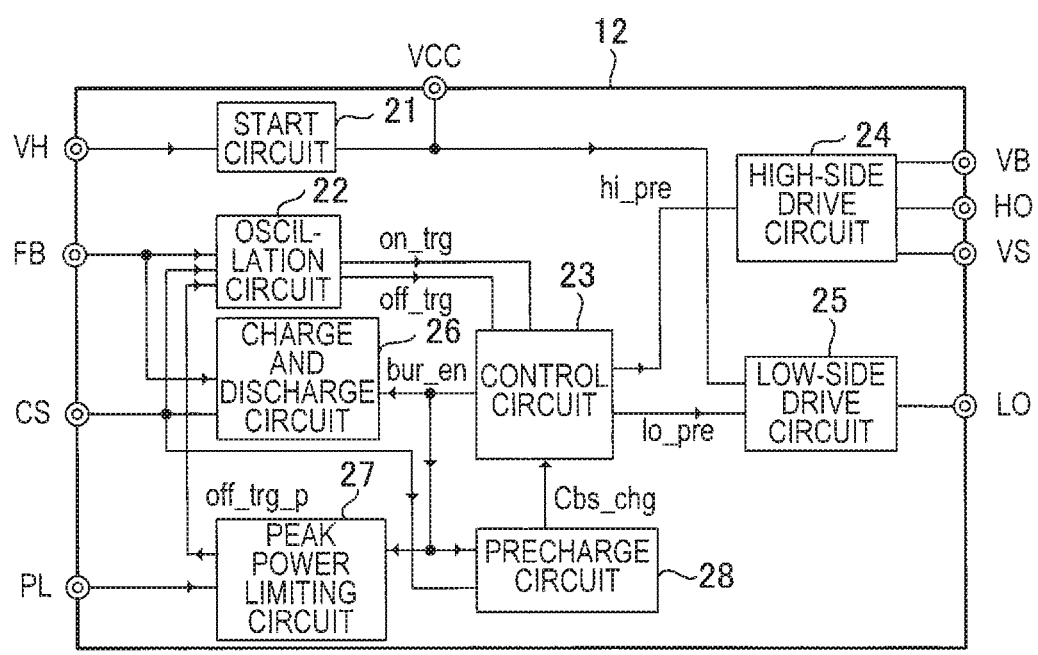
FIG. 2 is a functional block diagram illustrative of an example of the structure of the control IC.

FIG. 1 is a circuit diagram illustrative of an example of the structure of a current resonance switching power supply including a control IC according to an embodiment. FIG. 2 is a functional block diagram illustrative of an example of the structure of the control IC.

A switching power supply illustrated in FIG. 1 has input terminals $10p$ and $10n$, and a direct-current input voltage Vi is applied between the input terminals $10p$ and $10n$. For example, the input voltage Vi is a constant high voltage generated by a power factor correction circuit. Furthermore, an input capacitor C1 and a half-bridge circuit including a high-side switching element Qa and a low-side switching element Qb are connected to the input terminals $10p$ and $10n$. The input capacitor C1 and the half-bridge circuit are connected in parallel. In the example of FIG. 1, n-channel metal-oxide-semiconductor field-effect transistors (MOSFETs) are used as the switching elements Qa and Qb. In addition, the switching element Qa and a capacitor Ca are connected in parallel and the switching element Qb and a capacitor Cb are connected in parallel. The capacitance of the capacitor Ca is mainly parasitic capacitance between a drain terminal and a source terminal of the switching element Qa and the capacitance of the capacitor Cb is mainly parasitic capacitance between a drain terminal and a source terminal of the switching element Qb.

A common connection point of the switching elements Qa and Qb is connected to one terminal of a primary winding P1 of a transformer T1 and the other terminal of the primary winding P1 is connected to a ground via a resonance capacitor C6. A leakage inductance component between the primary winding P1 and secondary windings S1 and S2 of the transformer T1 and the resonance capacitor C6 make up a resonance circuit. There may be no need to use the leakage inductance. In this case, an inductance other than the inductance included in the transformer T1 is connected in series with the resonance capacitor C6 and is used as a resonance reactance of a resonance circuit.

One terminal of the secondary winding S1 of the transformer T1 is connected to an anode terminal of a diode D3. One terminal of the secondary winding S2 of the transformer T1 is connected to an anode terminal of a diode D4. Cathode terminals of the diodes D3 and D4 are connected to a positive electrode terminal of an output capacitor C10 and an output terminal $11p$. A negative electrode terminal of the output capacitor C10 is connected to a common connection point of the secondary windings S1 and S2 and an output terminal $11n$. The secondary windings S1 and S2, the diodes D3 and D4, and the output capacitor C10 make up a circuit which rectifies and smooths an alternating-current voltage generated in the secondary windings S1 and S2 and which converts it to a direct-current output voltage Vo. This circuit is an output circuit of the switching power supply.

The positive electrode terminal of the output capacitor C10 is connected via a resistor R8 to an anode terminal of a light-emitting diode of a photocoupler PC1. A cathode terminal of the light-emitting diode is connected to a cathode terminal of a shunt regulator SR1. A resistor S6 is connected between the anode terminal and the cathode terminal of the light-emitting diode. An anode terminal of the shunt regulator SR1 is connected to the output terminal $11n$. The shunt regulator SR1 has a reference terminal connected to a connection point of resistors R9 and R10 connected in series between the positive electrode terminal and the negative electrode terminal of the output capacitor C10. A circuit made up of a resistor R7 and a capacitor C11 connected in series is connected between the reference terminal and the cathode terminal of the shunt regulator SR1. The shunt regulator SR1 causes a current corresponding to the difference between a voltage obtained by dividing the output voltage Vo (voltage across the output capacitor C10) and an internal reference voltage to flow to the light-emitting diode of the photocoupler PC1. A collector terminal of a phototransistor of the photocoupler PC1 is connected to an FB terminal of a control integrated circuit (IC) 12. An emitter terminal of the phototransistor is connected to the ground. A capacitor C2 is connected between the collector terminal and the emitter terminal of the phototransistor.

The control IC 12 is a controller which controls the switching power supply. The control IC 12 has a VH terminal connected to a positive electrode terminal of the input capacitor C1 and a GND terminal connected to the ground. Furthermore, the control IC 12 has an HO terminal connected via a resistor R1 to a gate terminal of the switching element Qa and an LO terminal connected via a resistor R2 to a gate terminal of the switching element Qb. In addition, the control IC 12 has a CS terminal, a VB terminal, a VS terminal, a VCC terminal, and a PL terminal.

A bootstrap capacitor C5 used as a power source for a high-side circuit is connected between the VB terminal and the VS terminal. The VS terminal is connected to the common connection point of the switching elements Qa and Qb. The VCC terminal is connected to a positive electrode terminal of a capacitor C3 which is a power source terminal of a low-side circuit, and a negative electrode terminal of the capacitor C3 is connected to the ground. Furthermore, the VCC terminal is connected to an anode terminal of a bootstrap diode D2 and a cathode terminal of the bootstrap diode D2 is connected to the VB terminal. The VCC terminal is connected via a diode to an auxiliary winding of the transformer T1 (not illustrated for the sake of the simplicity of FIG. 1). After the switching power supply is started, a current induced in the auxiliary winding is stored in the capacitor C3 and is used as a power source for the control IC 12. A capacitor C4 charged and discharged for forming a triangular wave is connected to the CS terminal. The voltage of the triangular wave is a first voltage signal. The PL terminal is connected to a common connection point of resistors R3 and R4 connected in series. The resistors R3 and R4 connected in series and a resonance capacitor C6 are connected in parallel. As a result, a voltage obtained by dividing a voltage across the resonance capacitor C6 is supplied to the PL terminal as a signal indicative of power.

As illustrated in FIG. 2, the control IC 12 includes a start circuit 21 whose input terminal is connected to the VH terminal. An output terminal of the start circuit 21 is connected to the VCC terminal. The FB terminal and the CS terminal are connected to an input terminal of an oscillation circuit 22. An output terminal of the oscillation circuit 22 is connected to a control circuit 23 to supply an on-trigger signal on_trg and an off-trigger signal off_trg to the control circuit 23. The FB terminal is pulled up via a resistor (not illustrated) to a reference voltage (not illustrated). A high-side output terminal of the control circuit 23 is connected to an input terminal of a high-side drive circuit 24 to supply a high-side drive signal hi_pre to the high-side drive circuit 24. A low-side output terminal of the control circuit 23 is connected to an input terminal of a low-side drive circuit 25 to supply a low-side drive signal lo_pre to the low-side drive circuit 25. An output terminal of the high-side drive circuit 24 is connected to the HO terminal and an output terminal of the low-side drive circuit 25 is connected to the LO terminal. The high-side drive circuit 24 is also connected to the VB terminal for a high-side power source and the VS terminal which is a high-side reference potential. The low-side drive circuit 25 is also connected to the VCC terminal.

The FB terminal is also connected to an input terminal of a charge and discharge circuit 26. Furthermore, the charge and discharge circuit 26 is connected to the control circuit 23 to receive a burst operation signal bur_en from the control circuit 23. An output terminal of the charge and discharge circuit 26 is connected to the CS terminal and the input terminal of the oscillation circuit 22. The PL terminal is connected to an input terminal of a peak power limiting circuit 27. Furthermore, the peak power limiting circuit 27 is connected to the control circuit 23 to receive the burst operation signal bur_en from the control circuit 23. An output terminal of the peak power limiting circuit 27 is connected to the input terminal of the oscillation circuit 22 to supply a forced turn-off signal off_trg_p to the oscillation circuit 22. In addition, the CS terminal is connected to an input terminal of a precharge circuit 28. The precharge circuit 28 is also connected to the control circuit 23 to receive the burst operation signal bur_en from the control circuit 23. An output terminal of the precharge circuit 28 is connected to the control circuit 23 to supply a precharge signal Cbs_chg to the control circuit 23.

A concrete example of the structure of each of the oscillation circuit 22, the charge and discharge circuit 26, the peak power limiting circuit 27, and the precharge circuit 28 included in the control IC 12 will now be described.

Figure 3:
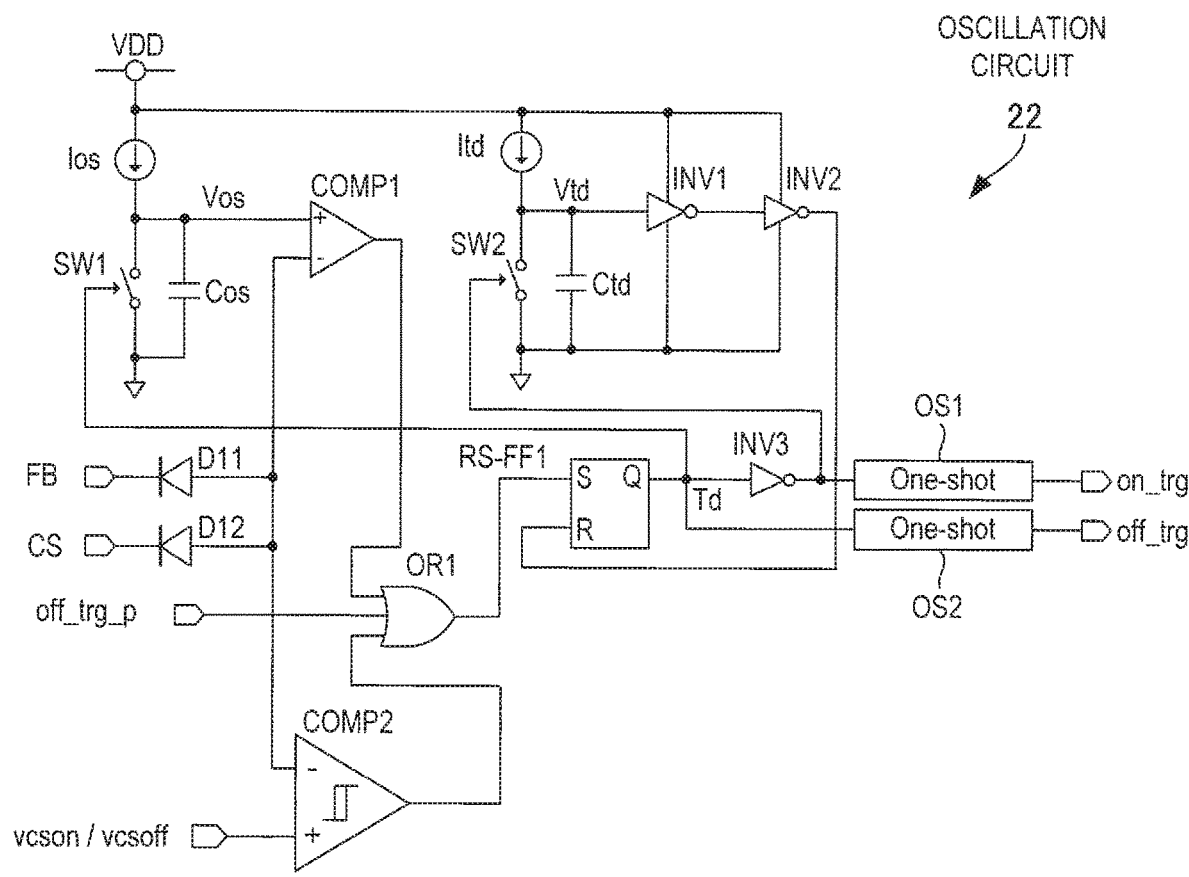
FIG. 3 is a circuit diagram illustrative of an example of the structure of an oscillation circuit.
Figure 4:
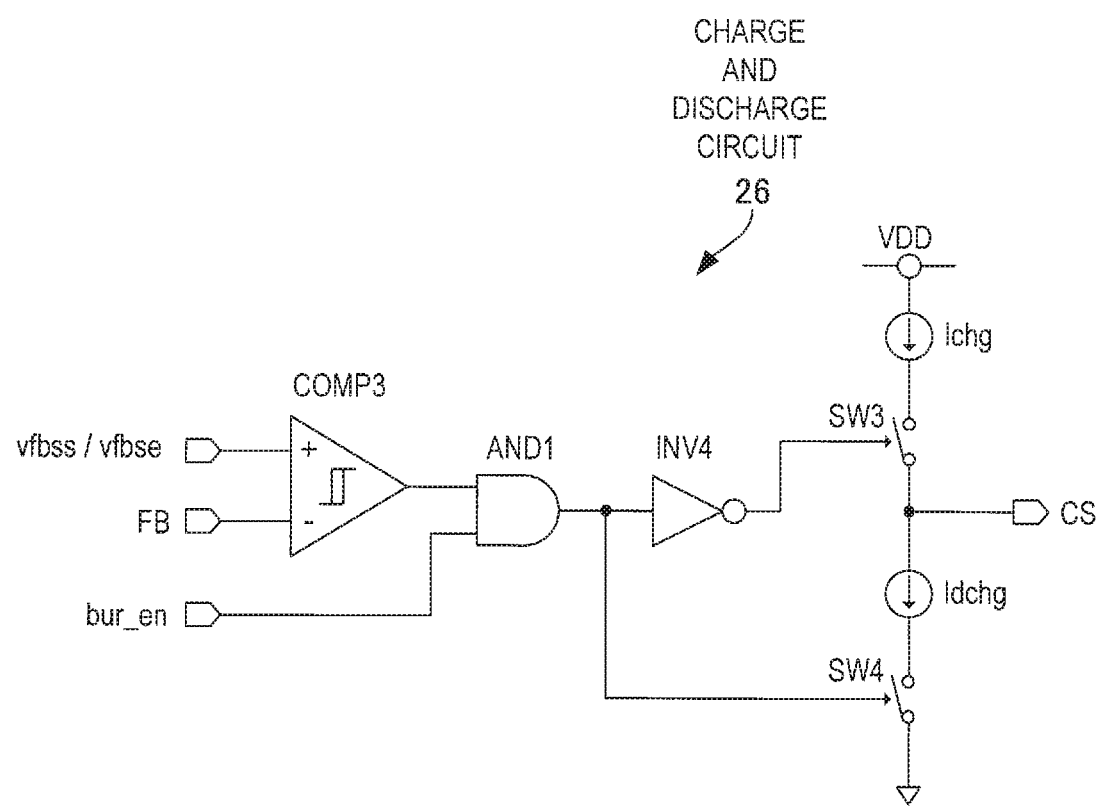
FIG. 4 is a circuit diagram illustrative of an example of the structure of a charge and discharge circuit.
Figure 5:
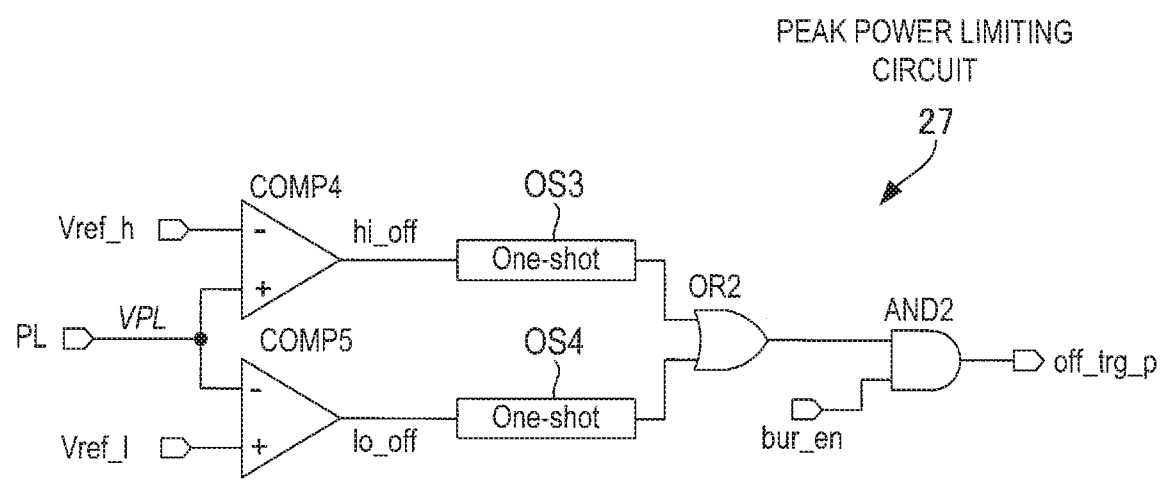
FIG. 5 is a circuit diagram illustrative of an example of the structure of a peak power limiting circuit.
Figure 6:
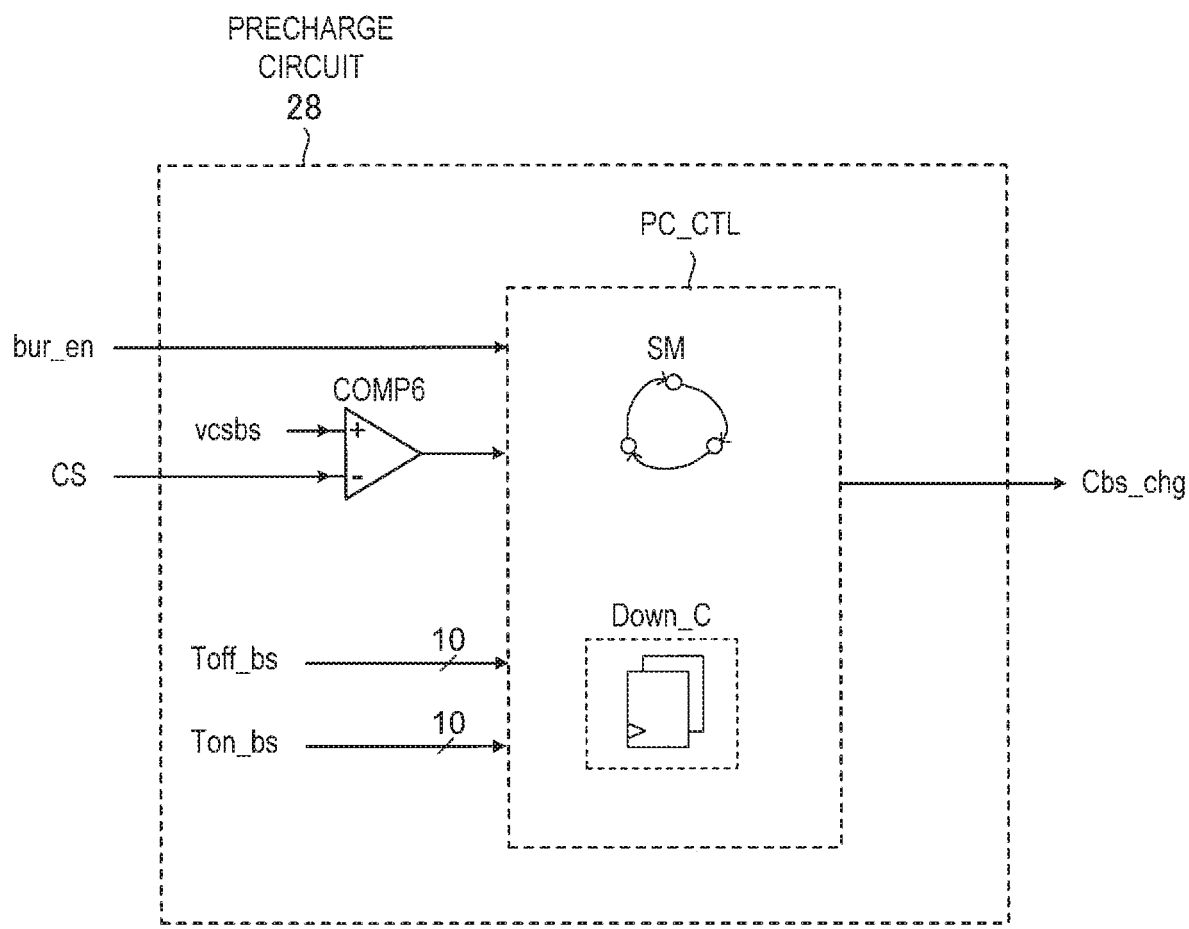
FIG. 6 is a circuit diagram illustrative of an example of the structure of a precharge circuit.
Figure 7:
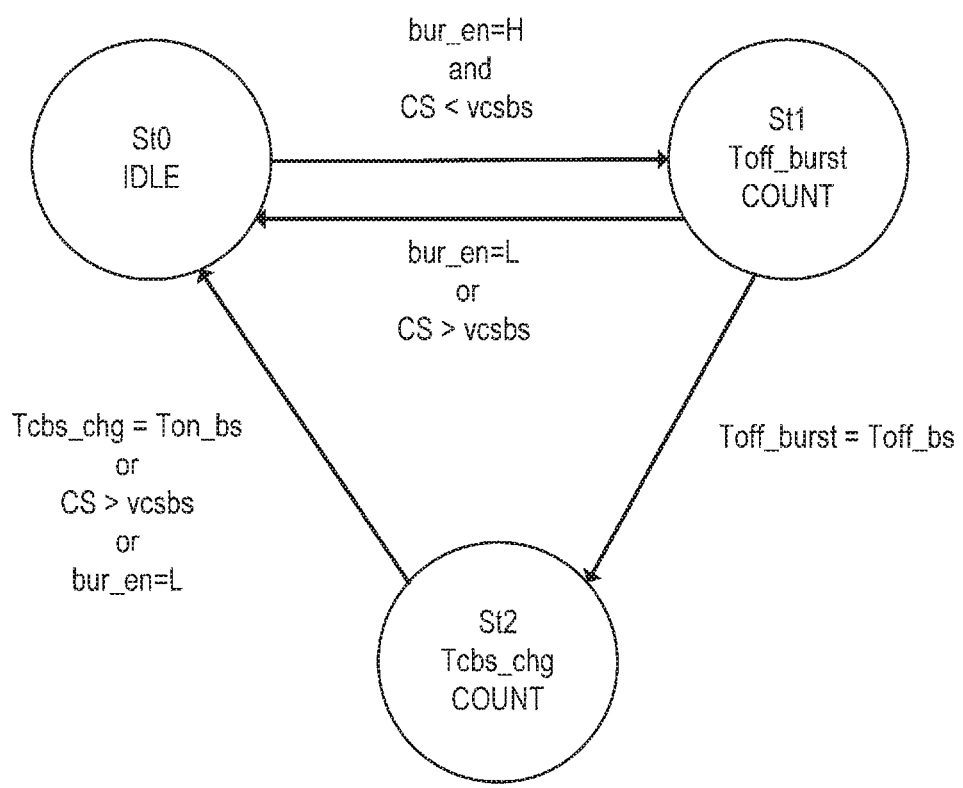
FIG. 7 is a state transition diagram which describes a state machine of a precharge controller.

FIG. 3 is a circuit diagram illustrative of an example of the structure of the oscillation circuit. FIG. 4 is a circuit diagram illustrative of an example of the structure of the charge and discharge circuit. FIG. 5 is a circuit diagram illustrative of an example of the structure of the peak power limiting circuit. FIG. 6 is a circuit diagram illustrative of an example of the structure of the precharge circuit. FIG. 7 is a state transition diagram which describes a state machine of a precharge controller. FIG. 8 is a view for describing the state of the state machine.

As illustrated in FIG. 3, the oscillation circuit 22 includes diodes D11 and D12 whose cathode terminals are connected to the FB terminal and the CS terminal respectively. Both of anode terminals of the diodes D11 and D12 are connected to an inverting input terminal of a comparator COMP1 and an inverting input terminal of a hysteresis comparator COMP2. A non-inverting input terminal of the comparator COMP1 is connected to a connection point of one terminal of a constant-current source Ios and one terminal of a capacitor Cos. A non-inverting input terminal of the hysteresis comparator COMP2 is connected to a terminal which receives a threshold voltage vcson or vcsoff generated inside the control IC 12. The other terminal of the constant-current source Ios is connected to a power source VDD. The other terminal of the capacitor Cos is connected to the ground. The capacitor Cos and a switch SW1 are connected in parallel.

An output terminal of the comparator COMP1 is connected to a first input terminal of an OR circuit OR1. A second input terminal of the OR circuit OR1 is connected to a terminal which receives a forced turn-off signal off_trg_p from the peak power limiting circuit 27. A third input terminal of the OR circuit OR1 is connected to an output terminal of the hysteresis comparator COMP2. An output terminal of the OR circuit OR1 is connected to a set input terminal S of an RS flip-flop RS-FF1.

An output terminal Q of the RS flip-flop RS-FF1 is connected to a control input terminal of the switch SW1, an input terminal of an inverter circuit INV3, and an input terminal of a one-shot circuit OS2. An output terminal of the inverter circuit INV3 is connected to the input terminal of a one-shot circuit OS1. An output terminal of the one-shot circuit OS1 is a terminal which outputs an on-trigger signal on_trg of the oscillation circuit 22. An output terminal of the one-shot circuit OS2 is a terminal which outputs an off-trigger signal off_trg of the oscillation circuit 22.

The output terminal of the inverter circuit INV3 is also connected to a control input terminal of a switch SW2. One terminal of the switch SW2 is connected to one terminal of a constant-current source Itd, one terminal of a capacitor Ctd, and an input terminal of an inverter circuit INV1. The other terminal of the constant-current source Itd is connected to the power source VDD. The other terminal of the switch SW2 is connected to the other terminal of the capacitor Ctd and the ground. An output terminal of the inverter circuit INV1 is connected to an input terminal of an inverter circuit INV2. An output terminal of the inverter circuit INV2 is connected to a reset input terminal R of the RS flip-flop RS-FF1.

As illustrated in FIG. 4, the charge and discharge circuit 26 connected to the CS terminal of the oscillation circuit 22 includes a hysteresis comparator COMP3. An inverting input terminal of the hysteresis comparator COMP3 is connected to the FB terminal of the control IC 12 and a non-inverting input terminal of the hysteresis comparator COMP3 is connected to a terminal which receives a threshold voltage vfbss or vfbse generated inside the control IC 12. An output terminal of the hysteresis comparator COMP3 is connected to one input terminal of an AND circuit AND1. The other input terminal of the AND circuit AND1 is connected to a terminal which receives a burst operation signal bur_en from the control circuit 23. An output terminal of the AND circuit AND1 is connected via an inverter circuit INV4 to a control input terminal of a switch SW3. One terminal of the switch SW3 is connected to one terminal of a constant-current source Ichg. The other terminal of the constant-current source Ichg is connected to the power source VDD. The other terminal of the switch SW3 is connected to the CS terminal and one terminal of a constant-current source Idchg. The other terminal of the constant-current source Idchg is connected via a switch SW4 to the ground. A control input terminal of the switch SW4 is connected to the output terminal of the AND circuit AND1. The constant-current source Ichg determines the slope of a triangular wave at soft start time. The constant-current source Idchg determines the slope of a triangular wave at soft end time.

As illustrated in FIG. 5, the peak power limiting circuit 27 connected to a terminal of the oscillation circuit 22 which receives a forced turn-off signal off_trg_p includes two comparators COMP4 and COMP5. An inverting input terminal of the comparator COMP4 is connected to a terminal which receives a threshold voltage Vref_h generated inside the control IC 12. A non-inverting input terminal of the comparator COMP5 is connected to a terminal which receives a threshold voltage Vref_1 generated inside the control IC 12. A non-inverting input terminal of the comparator COMP4 and an inverting input terminal of the comparator COMP5 are connected to the PL terminal of the control IC 12. An output terminal of the comparator COMP4 is connected via a one-shot circuit OS3 to one input terminal of an OR circuit OR2. An output terminal of the comparator COMP5 is connected via a one-shot circuit OS4 to the other input terminal of the OR circuit OR2. An output terminal of the OR circuit OR2 is connected to one input terminal of an AND circuit AND2. The other input terminal of the AND circuit AND2 is connected to a terminal which receives a burst operation signal bur_en from the control circuit 23. An output terminal of the AND circuit AND2 is an output terminal of the peak power limiting circuit 27 and the forced turn-off signal off_trg_p is supplied to the oscillation circuit 22.

As illustrated in FIG. 6, the precharge circuit 28 connected to the CS terminal of the oscillation circuit 22 includes a comparator COMP6. The CS terminal of the control IC 12 which generates a first voltage signal is connected to an inverting input terminal of the comparator COMP6 and a terminal which receives a threshold voltage vcsbs as a second voltage signal generated inside the control IC 12 is connected to a non-inverting input terminal of the comparator COMP6. The comparator COMP6 has the function of detecting a switching stop state in burst operation. An output terminal of the comparator COMP6 is connected to a precharge controller PC_CTL. The precharge controller PC_CTL is informed of a switching stop state in a burst operation detected by the comparator COMP6.

The precharge controller PC_CTL receives from the control circuit 23 a burst operation signal bur_en indicative of whether or not a burst operation is being performed. Furthermore, the precharge controller PC_CTL receives a 10-bit stop period set value Toff_bs by which the upper limit of a switching stop period in a burst operation is set and a 10-bit precharge period set value Ton_bs by which a precharge period is set. For example, 100 microseconds (µs) are set as the stop period set value Toff_bs and 20 µs are set as the precharge period set value Ton_bs. The precharge controller PC_CTL includes a state machine SM which defines a plurality of states inputted and a transition between states and a down counter Down_C which counts a switching stop period and a precharge period. An output terminal of the precharge controller PC_CTL is connected to a terminal from which a precharge signal Cbs_chg is supplied to the control circuit 23.

As illustrated in FIGS. 7 and 8, the state machine SM included in the precharge controller PC_CTL has an idle state St0, Toff_burst count state St1, and a Tcbs_chg count state St2.

When a burst operation signal bur_en is at a high (H) level and the comparator COMP6 detects that "CS<vcsbs," the transition from the idle state St0 to the Toff_burst count state St1 is made.

In the Toff_burst count state St1, the down counter Down_C counts down a stop period set value Toff_bs set in advance. By doing so, the down counter Down_C counts the length of a switching stop period Toff_burst. When, during the counting of the switching stop period Toff_burst, the burst operation signal bur_en becomes a low (L) level or the comparator COMP6 detects that "CS>vcsbs," the transition from the Toff_burst count state St1 to the idle state St0 is made. Furthermore, when a count-down value of the stop period set value Toff_bs becomes 0 during the counting of the switching stop period Toff_burst, the transition from the Toff_burst count state St1 to the Tcbs_chg count state St2 is made.

In the Tcbs_chg count state St2, the down counter Down_C counts down a precharge period set value Ton_bs set in advance. By doing so, the down counter Down_C counts the length of a precharge period Tcbs_chg. The transition from the Tcbs_chg count state St2 to the idle state St0 is made when, during the counting of the precharge period Tcbs_chg, the burst operation signal bur_en becomes an L level or the comparator COMP6 detects that "CS>vcsbs". Alternatively, the transition from the Tcbs_chg count state St2 to the idle state St0 is made when a count-down value of the precharge period set value Ton_bs becomes 0 during the counting of the precharge period Tcbs_chg. As a result, in the Tcbs_chg count state St2, the on-width of a precharge signal Cbs_chg is counted.

If the switching stop period Toff_burst in a burst operation continues for a period longer than 100 µs, then the precharge controller PC_CTL outputs in this way a precharge signal Cbs_chg having an on-width of 20 µs. The control circuit 23 which receives the precharge signal Cbs_chg turns on the low-side switching element Qb for the period of the precharge period set value Ton_bs. By doing so, the bootstrap capacitor C5 is precharged and a voltage of the high-side power source is ensured.

The operation of the current resonance switching power supply having the above structure will be described. First, when the switching power supply operates in a normal mode, the control circuit 23 outputs an L-level burst operation signal bur_en. Accordingly, an output of the AND circuit AND1 in the charge and discharge circuit 26 is fixed at an L level. As a result, the high-side switch SW3 is in a conducting state and the low-side switch SW4 is in a shutdown state. This continues to charge the capacitor C4 connected to the CS terminal with a charging current from the constant-current source Ichg. Therefore, a voltage signal at the CS terminal is kept at a high value.

At this time, a switching frequency in the oscillation circuit 22 is determined according to one of a voltage at the FB terminal and a voltage at the CS terminal, whichever is lower than the other. In this case, the voltage signal at the CS terminal has a high value. Therefore, a switching frequency in the oscillation circuit 22 is determined by a feedback signal received by the FB terminal. That is to say, in the normal mode, an output of the hysteresis comparator COMP2 is at an L level. Accordingly, when a charging voltage Vos of the capacitor Cos becomes higher than the voltage at the FB terminal, the RS flip-flop RS-FF1 is set and an H-level signal Td is outputted.

The signal Td is inputted to the one-shot circuit OS2. The one-shot circuit OS2 outputs an off-trigger signal off_trg having a determined on-width which rises in synchronization with the rising edge of the signal Td.

At this time, the switch SW1 is turned on (goes into a conducting state) by the H-level signal Td. Therefore, electric charges stored in the capacitor Cos are discharged. In addition, an output of the inverter circuit INV3 becomes an L level and the switch SW2 is turned off (goes into a shutdown state). As a result, a delay circuit including the inverter circuits INV1 and INV2 begins a delay operation. When a charging voltage Vtd of the capacitor Ctd becomes higher than a threshold voltage of the inverter circuit INV1 in this delay circuit, the RS flip-flop RS-FF1 is reset and the signal Td becomes an L level. The signal Td is logic-inverted by the inverter circuit INV3 and is inputted to the one-shot circuit OS1. The one-shot circuit OS1 outputs an on-trigger signal on_trg having a determined on-width which rises in synchronization with the falling edge of the signal Td. The control circuit 23 receives the signal off_trg and the signal on_trg and outputs a high-side drive signal hi_pre and a low-side drive signal lo_pre which rise by the signal on_trg and which fall by the signal off_trg. By doing so, the high-side drive circuit 24 on-off controls the switching element Qa, and the low-side drive circuit 25 on-off controls the switching element Qb. By on-off controlling the switching elements Qa and Qb, a resonance current of the resonance circuit is controlled and the resonance current flows through the primary winding P1 of the transformer T1 and the resonance capacitor C6.

At this time, a voltage which appears across the resonance capacitor C6 is divided by a voltage division circuit made up of the resistors R3 and R4 and an obtained voltage VPL is inputted to the PL terminal. However, even when the voltage VPL is inputted to the PL terminal, the peak power limiting circuit 27 outputs an L-level forced turn-off signal off_trg_p to the output terminal because the AND circuit AND2 receives an L-level burst operation signal bur_en.

Furthermore, because the L-level burst operation signal bur_en is inputted from the control circuit 23, a precharge operation by the precharge circuit 28 is made invalid and the precharge circuit 28 outputs an L-level precharge signal Cbs_chg.

Next, the operation of the switching power supply at a burst operation time in a standby mode will be described. First, a burst operation performed when a load is light, that is to say, when the precharge circuit 28 does not function will be described, and then a burst operation performed when a load is ultralight (for example, when there is no load), that is to say, when the precharge circuit 28 functions will be described.

Figure 9:
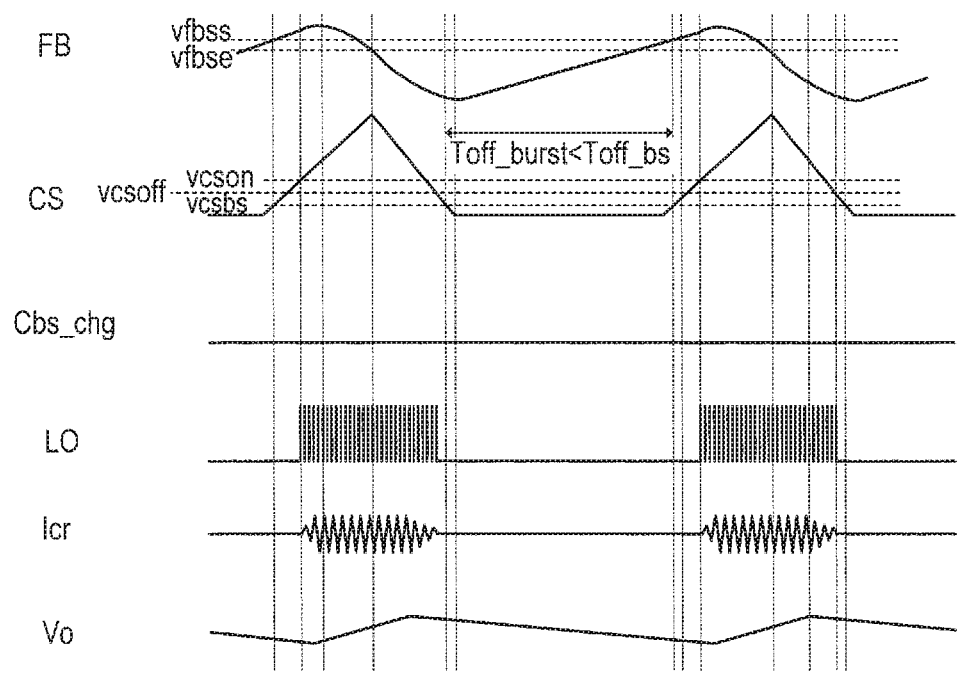
FIG. 9 illustrates operational waveforms in a burst operation at the time of a load being light.
Figure 10:
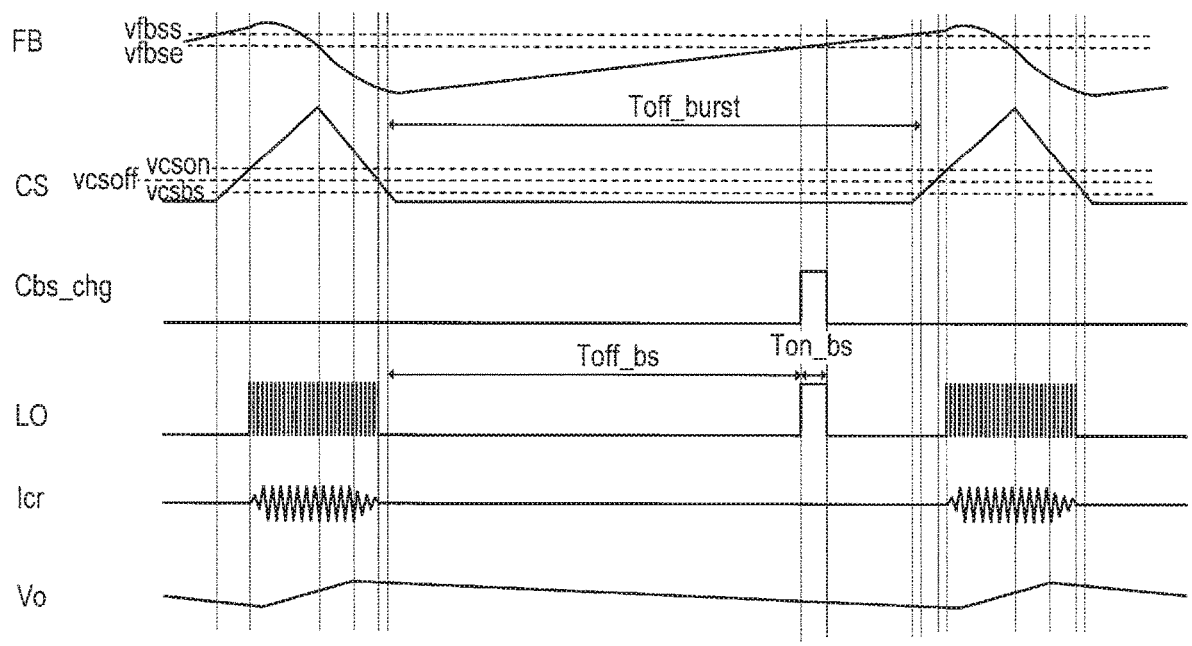
FIG. 10 illustrates operational waveforms in a burst operation at the time of a load being ultralight.

FIG. 9 illustrates operational waveforms in a burst operation at the time of a load being light. FIG. 10 illustrates operational waveforms in a burst operation at the time of a load being ultralight.

With a burst operation in a standby mode, the control circuit 23 outputs an H-level burst operation signal bur_en. As a result, charging and discharging operations by the charge and discharge circuit 26 is made valid, an output of a forced turn-off signal off_trg_p by the peak power limiting circuit 27 is made valid, and an output of a precharge signal Cbs_chg by the precharge circuit 28 is made valid.

Furthermore, a switching frequency in the oscillation circuit 22 is controlled by a voltage CS at the CS terminal. With soft start, a switching frequency in the oscillation circuit 22 is controlled to become lower as the voltage CS rises. With soft end, a switching frequency in the oscillation circuit 22 is controlled to become higher as the voltage CS falls.

If switching of the switching elements Qa and Qb is performed at the time of a load being light, then power more than power consumed by the load is transmitted to the output side. As a result, a voltage FB at the FB terminal falls. In the initial state illustrated in FIG. 9, the voltage FB is lower than the threshold voltage vfbse on the low potential side illustrated in FIG. 4. Accordingly, in the charge and discharge circuit 26, the switch SW3 is in an off state, the switch SW4 is in an on state, and a potential at the CS terminal is a ground potential. In this initial state, the voltage FB at the FB terminal gradually rises because switching of the switching elements Qa and Qb is stopped.

When the voltage FB at the FB terminal exceeds the threshold voltage vfbss, an output of the hysteresis comparator COMP5 becomes an L level. As a result, an output of the AND circuit AND1 becomes an L level, an output of the inverter circuit INV4 becomes an H level, charging of the capacitor C4 by the constant-current source Ichg is begun. Therefore, a voltage CS at the CS terminal begins to rise, and soft start is begun.

If the voltage CS at the CS terminal is lower at soft start time than the threshold voltage vcson on the high potential side generated inside the control IC 12, then an output of the hysteresis comparator COMP2 becomes an H level. Inputting this H-level signal via the OR circuit OR1 to the set input terminal S of the RS flip-flop RS-FF1 is continued. Therefore, an on-trigger signal on_trg is not outputted and switching of the switching elements Qa and Qb is stopped.

If the voltage CS at the CS terminal rises and exceeds the high-side threshold voltage vcson generated inside the control IC 12, then an output of the hysteresis comparator COMP2 becomes an L level and switching is begun. As a result, for example, a signal LO by which the switching element Qb is on-off controlled is outputted to the low-side LO terminal. As a result, the resonance circuit begins resonance and a current Icr flows through the resonance capacitor C6. Because, at this time, a switching frequency is high at first, voltage gain is low. Accordingly, an ineffective switching region in which the amount of energy transmitted from the primary side to the secondary side is small or zero is entered. When the voltage CS at the CS terminal rises further, the switching frequency becomes lower, the voltage gain becomes higher, and the amount of energy transmitted from the primary side to the secondary side increases. As a result, the output voltage Vo gradually rises.

When switching of the switching elements Qa and Qb is begun and the amount of energy transmitted from the input side to the output side increases, the voltage FB at the FB terminal falls. When the voltage FB falls below the threshold voltage vfbse, an output of the hysteresis comparator COMP5 and an output of the AND circuit AND1 become an H level. As a result, the low-side switch SW4 is turned on, discharging the capacitor C4 by the constant-current source Idchg is begun, and the voltage CS at the CS terminal begins to fall. Furthermore, when the voltage CS at the CS terminal falls below the threshold voltage vcsoff on the low potential side, an output of the hysteresis comparator COMP2 becomes an H level and switching of the switching elements Qa and Qb is stopped.

At soft end time, the voltage CS at the CS terminal falls. When the voltage CS at the CS terminal falls below the low-side threshold voltage vcsoff generated inside the control IC 12, an output of the hysteresis comparator COMP2 becomes an H level and switching of the switching elements Qa and Qb is stopped. At the soft end time, the switching frequency becomes higher. However, the voltage gain becomes lower on the way and an ineffective switching region is entered.

In an effective region between the ineffective switching region of the soft start and the ineffective switching region of the soft end, the amount of energy transmitted from the primary side to the secondary side is large and the output voltage Vo gradually rises. Furthermore, if the amount of energy transmitted from the primary side to the secondary side is excessive in this effective region, then a peak power is limited by the peak power limiting circuit 27. As a result, even if the slope of the voltage CS is set to become great for the purpose of reducing the ineffective switching regions, the peak value of the resonance current Icr of the resonance capacitor C6 is suppressed. This suppresses the generation of audible noise.

The threshold voltages vfbss and vfbse compared with the voltage FB at the FB terminal are set so as to be higher than the voltage CS at the CS terminal in the burst operation. Therefore, a switching frequency at a burst operation time is controlled only by the voltage CS at the CS terminal.

When the voltage CS at the CS terminal falls below the threshold voltage vcsbs of the precharge circuit 28, the comparator COMP6 outputs an H-level signal to inform the precharge controller PC_CTL that a switching stop period in a burst operation is entered. The precharge controller PC_CTL receives this notice and the down counter Down_C counts the switching stop period Toff_burst. When the load is light, then power is consumed according to the magnitude of the load. Accordingly, the voltage FB at the FB terminal gradually rises for this period. When the voltage FB at the FB terminal exceeds the threshold voltage vfbss, the switching stop period Toff_burst ends and soft start is begun again. At this time, the switching stop period Toff_burst is not longer than 100 μs which are the stop period set value Toff_bs. Accordingly, the precharge controller PC_CTL returns to the idle state St0 and a precharge signal Cbs_chg remains at an L level.

At soft start time and soft end time, a voltage VPL corresponding to the resonance current Icr is inputted to the PL terminal of the peak power limiting circuit 27 and is compared with the threshold voltages Vref_h and Vrel_l by the comparators COMP4 and COMP5 respectively.

If the voltage VPL is higher than the high-side threshold voltage Vref_h or lower than the low-side threshold voltage Vrel_l, then the peak power limiting circuit 27 outputs a forced turn-off signal off_trg_p. When the forced turn-off signal off_trg_p is inputted, the oscillation circuit 22 outputs a signal off_trg to limit the power of resonance operation to a determined range.

Next, if the load of the switching power supply becomes ultralight (no-load, for example) at burst operation time in the standby mode, then a rise in the voltage FB at the FB terminal during the switching stop period Toff_burst is gentle compared with a case where the load is light. Therefore, as illustrated in FIG. 10, the switching stop period Toff_burst is longer than the stop period set value Toff_bs.

In this case, at the same time that the switching stop period Toff_burst begins, the down counter Down_C of the precharge circuit 28 counts down the switching stop period Toff_burst. When a count value of the down counter Down_C becomes 0, the precharge controller PC_CTL outputs an H-level precharge signal Cbs_chg and begins to count down the stop period set value Toff_bs. When a count value of the down counter Down_C becomes 0, the precharge controller PC_CTL sets the precharge signal Cbs_chg to an L level.

When the control circuit 23 receives the H-level precharge signal Cbs_chg, the control circuit 23 outputs a signal LO which on-controls the switching element Qb only for 20 μs. The switching element Qb is accordingly turned on. By doing so, the VS terminal of the control IC 12, that is to say one terminal of the bootstrap capacitor C5, is connected to the ground via the switching element Qb. As a result, a voltage VCC higher than the ground is applied via the bootstrap diode D2 to the other terminal of the bootstrap capacitor C5 and the bootstrap capacitor C5 is precharged only for 20 μs.

In the above embodiment, the stop period set value Toff_bs and the precharge period set value Ton_bs are set to fixed values in the precharge circuit 28. However, it is desirable to set each of the stop period set value Toff_bs and the precharge period set value Ton_bs to any value from the outside at need.

With the switching power supply controller having the above structure, a bootstrap capacitor which is a high-side power source is precharged only for a short period of time if a switching stop period in a burst operation in a standby mode is long. This maintains a high-side power source voltage, while maintaining a reduction in standby power. As a result, off-resonance does not occur when switching is resumed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. A switching power supply controller, comprising:
a high-side drive circuit;
a low-side drive circuit;
a control circuit which supplies a high-side drive signal to the high-side drive circuit, and which supplies a low-side drive signal to the low-side drive circuit;
an oscillation circuit which generates an on-trigger signal and an off-trigger signal at a switching frequency corresponding to a voltage signal, and which supplies the on-trigger signal and the off-trigger signal to the control circuit; and a precharge circuit which receives from the control circuit a burst operation signal, indicative of a burst operation in a standby mode, and which supplies for a second period a precharge signal that causes the control circuit to output the low-side drive signal upon detecting that a switching stop period, during which the first voltage signal falls below a threshold voltage, exceeds a first period, wherein the precharge circuit includes
- a comparator which compares the voltage signal with the threshold voltage, and
- a counter which counts the first period and the second period;

the precharge circuit counts the second period after counting the first period and outputs the precharge signal only for the second period; and when the burst operation signal goes into an off state during counting of the first period or the second period or when the voltage signal becomes higher than the threshold voltage, the precharge circuit transitions into an idle state.

2. The switching power supply controller according to claim 1, further comprising a charge and discharge circuit which generates a triangular wave voltage as the voltage signal during a soft start period and a soft end period during the burst operation.

* * * * *